(12) United States Patent
Svedman et al.

(10) Patent No.: US 9,986,520 B2
(45) Date of Patent: May 29, 2018

(54) METHOD AND SYSTEM FOR CELL SYNCHRONIZATION AND SYNCHRONIZATION CELL INDICATION

(71) Applicant: ZTE WISTRON TELECOM AB, Kista (SE)

(72) Inventors: Patrick Svedman, Kista (SE); Thorsten Schier, Kista (SE); Yonghong Gao, Kista (SE); Jan Johansson, Kista (SE); Aijun Cao, Kista (SE); Bojidar Hadjiski, Kista (SE)

(73) Assignee: ZTE WISTRON TELECOM AB, Kista (SE)

( * ) Notice: Subject to any disclaimer, the term of this patent is extended or adjusted under 35 U.S.C. 154(b) by 17 days.

(21) Appl. No.: 14/906,863

(22) PCT Filed: Jul. 21, 2014

(86) PCT No.: PCT/US2014/047471
§ 371 (c)(1),
(2) Date: Jan. 21, 2016

(87) PCT Pub. No.: WO2015/013208
PCT Pub. Date: Jan. 29, 2015

(65) Prior Publication Data
US 2016/0157194 A1  Jun. 2, 2016

Related U.S. Application Data

(60) Provisional application No. 61/857,110, filed on Jul. 22, 2013, provisional application No. 61/983,296, filed on Apr. 23, 2014.

(51) Int. Cl.
*H04W 56/00* (2009.01)
*H04B 7/26* (2006.01)

(52) U.S. Cl.
CPC ........ *H04W 56/001* (2013.01); *H04B 7/2656* (2013.01); *H04W 56/00* (2013.01)

(58) Field of Classification Search
None
See application file for complete search history.

(56) References Cited

U.S. PATENT DOCUMENTS 8,139,542 B2   3/2012  Dong et al.
9,628,215 B2 *  4/2017  Tan .................. H04J 11/005
(Continued)

FOREIGN PATENT DOCUMENTS

JP   2013-520880 A   6/2013
JP   2014-533036 A   12/2014
(Continued)

OTHER PUBLICATIONS

International Search Report/Written Opinion dated Nov. 25, 2014 in corresponding PCT Application No. PCT/US2014/47471.
(Continued)

*Primary Examiner* — Robert C. Scheibel
(74) *Attorney, Agent, or Firm* — Duane Morris LLP

(57) ABSTRACT

Provided is a synchronization cell used in a wireless communication system. Also provided is an SCI, synchronization cell indicator. A mobile network includes a processor that identifies one or more suitable synchronization cells for a user equipment (UE) and sends the SCI to the UE so that the UE can at least partially synchronize with a synchronization cell. The SCI advantageously includes a cell-id and other synchronization parameters and characteristics in various embodiments. The SCI may include a cell-directed UE action for the UE to carry out with a target cell. The UE carries out cell-directed UE actions with the target cell either after having obtained synchronization with the synchronization cell or to continue the synchronization process.

57 Claims, 1 Drawing Sheet

(56) References Cited

U.S. PATENT DOCUMENTS

| | | | | |
|---|---|---|---|---|
| 9,642,021 | B2* | 5/2017 | Siomina | H04W 24/00 |
| 2013/0077569 | A1* | 3/2013 | Nam | H04W 52/288 |
| | | | | 370/328 |
| 2013/0094411 | A1 | 4/2013 | Zhang | |
| 2013/0272132 | A1* | 10/2013 | Heo | H04W 28/02 |
| | | | | 370/236.2 |
| 2014/0051426 | A1* | 2/2014 | Siomina | H04W 36/0088 |
| | | | | 455/422.1 |
| 2014/0204765 | A1* | 7/2014 | Chai | H04W 24/08 |
| | | | | 370/241.1 |
| 2014/0274052 | A1* | 9/2014 | Pu | H04W 36/0083 |
| | | | | 455/436 |
| 2015/0162966 | A1* | 6/2015 | Kim | H04B 17/00 |
| | | | | 370/252 |

FOREIGN PATENT DOCUMENTS

| | | | |
|---|---|---|---|
| WO | 2011-103475 | A1 | 8/2011 |
| WO | 2013-066412 | A1 | 5/2013 |

OTHER PUBLICATIONS

Japanese Official Action dated Mar. 21, 2017 in corresponding Japanese Patent Application No. 2016-529817 with English Translation.

* cited by examiner

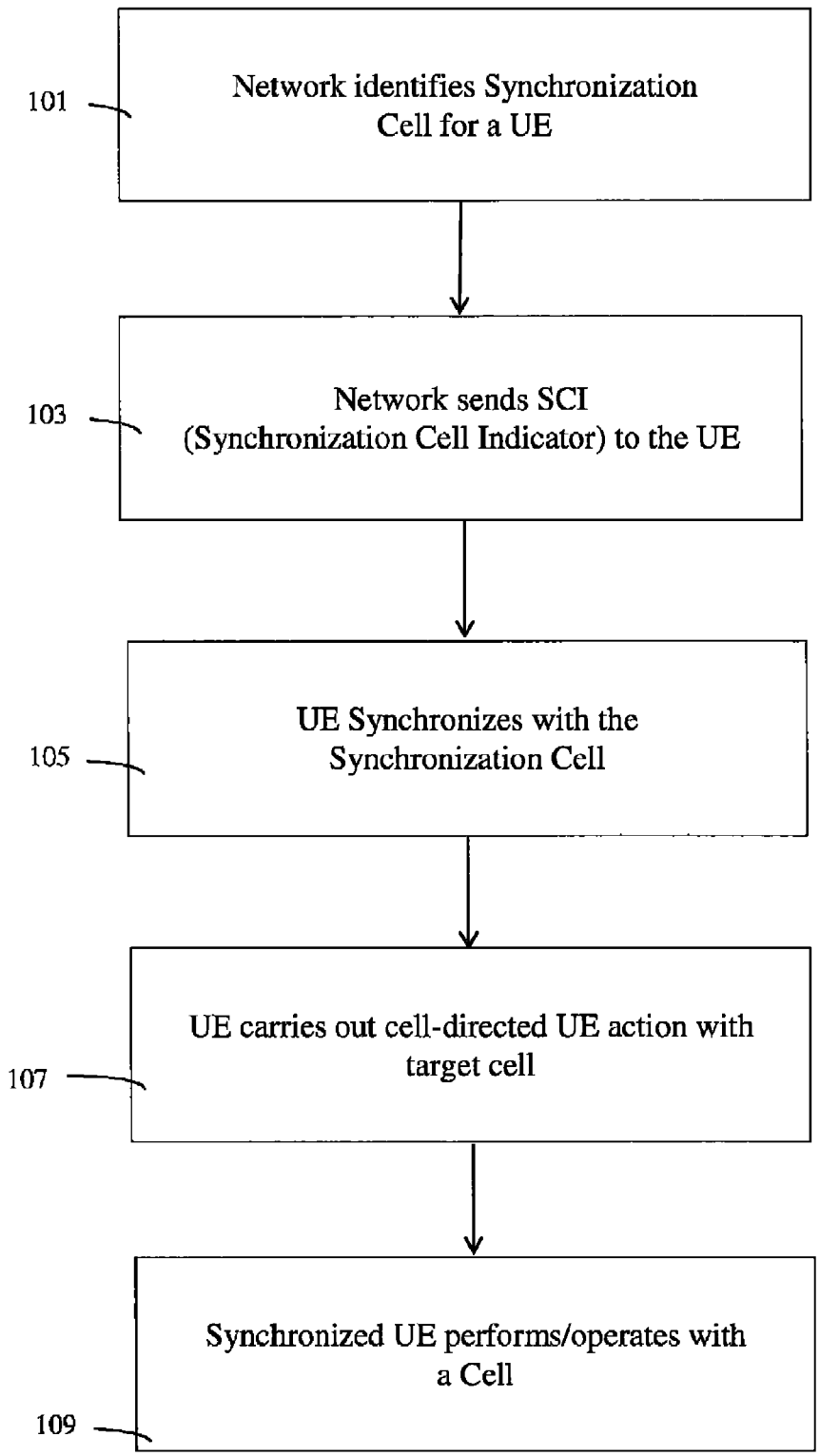

METHOD AND SYSTEM FOR CELL SYNCHRONIZATION AND SYNCHRONIZATION CELL INDICATION

RELATED APPLICATIONS

This application is a U.S. § 371 National Phase Application of International Application No. PCT/2014/047471 filed on Jul. 21, 2014 which claims priority to U.S. Provisional Application No. 61/857,110 filed Jul. 22, 2013 and also claims priority to U.S. Provisional Application No. 61/983,296 filed Apr. 23, 2014 the contents of each of which are hereby incorporated by reference as if set forth in their entireties.

BACKGROUND

Wireless communication systems are prevalent in today's world and are relied upon by practically everyone for day-to-day communications. Wireless communication systems typically are in the form of cellular networks or mobile networks which are wireless communication networks distributed over land areas called cells. Each cell is generally served by at least one fixed-location transceiver which is known as a cell site or the base station ("BS") of the cell. The base station communicates with various user equipment ("UE") types, such as cellular telephones, pagers, wireless notepads, computers and other mobile communication devices.

In wireless communication systems, time and frequency synchronization is essential for the communication of data. Typically, a receiver uses one or more signals transmitted by a transmitter to obtain and maintain synchronization. One example is the downlink (DL) in a wireless communication system, where a base station is a transmitter and a user equipment is a receiver. In order to advantageously and successfully receive a data transmission from a BS, the UE needs to be synchronized to the BS transmitter. The same is true for uplink (UL) transmission of data from a UE to a BS.

One aspect of synchronization is time synchronization. Time synchronization can mean that a UE detects the temporal structure of the signal received from the BS, on one or more levels of granularity. In LTE (Long Term Evolution) networks, for example, a UE can detect the symbol, slot, subframe, radio frame timing, etc., in the signal received from an evolved nodeB ("eNodeB," an LTE BS) or other BS. The time synchronization can be used to correctly extract other parts of the signal in time, for example parts carrying information and data.

Another aspect of synchronization is frequency synchronization. Frequency synchronization can mean that a UE estimates the carrier (center) frequency of the signal received from a BS in some examples but other frequency synchronization techniques are also used. Frequency synchronization can be used to improve the data reception performance.

As used herein, the term synchronization is used to refer to time synchronization, frequency synchronization or both.

In many cellular systems, the cells are distinguished from one another, from the perspective of the UE, by cell identity numbers (cell-ids). The cell-id is often reflected in different transmission characteristics for different cell-ids such as, for example, reference signal sequences, scrambling sequences, synchronization signal properties, and the like. A UE may able to detect the identity of the cell it is in, from certain estimated physical layer parameters, for example, and subsequently learn other properties such as physical layer properties from the detected cell-id. In some cellular systems, a BS can serve multiple cells, i.e. transmit and receive signals corresponding to multiple cells.

LTE (Long Term Evolution) and LTE-Advanced systems are cellular systems hereinafter referred to collectively as LTE cellular systems, LTE systems, LTE networks or simply LTE. UEs in LTE networks can detect the LTE network by searching for the primary and secondary synchronization signals (PSS and SSS), which are periodically transmitted by an evolved node B ("eNodeB" or "eNB"). From the detection of the primary and secondary synchronization signals, the UE can also learn the cell identity number (cell-id), which in LTE may be called physical cell identity (PCI). From the PCI, the UE learns the time and frequency location and the sequence used for the cell specific reference signal (CRS).

A UE is typically connected or associated with a cell which may be called the UE's serving cell. A cell from which a UE receives data and/or to which a UE transmits data is typically referred to as the serving cell. In other words, the UE functions by communicating with, exchanging information with, or carrying out actions with, its serving cell. In some examples, a UE is connected or associated with more than one cell, so that it can receive data from and/or transmit data to multiple cells. In such examples, the UE has multiple serving cells. This is a scenario if a UE is capable of carrier aggregation or coordinated multipoint (CoMP), such as in LTE Advanced networks.

Many of the actions a UE performs are directed towards a certain cell. Such a UE action is referred to herein as a cell-directed UE action. Examples of cell-directed UE actions include but are not limited to the following: A UE performs a measurement on signals from a certain cell. A UE initiates a random access procedure in order to connect to a certain cell, for example as part of a handover. A UE receives from or transmits to a certain cell.

These examples are discussed in further detail below. In each of these examples, the UE typically performs these actions in a way that is synchronized to the cell currently serving the UE. Different examples may require different levels of synchronization accuracy.

UEs are mobile devices that are capable of movement throughout geographical areas and the UE needs to be able to function with an associated cell as it moves about. In order to facilitate UE mobility in cellular systems, one cell-directed UE action involves a UE performing measurements on signals from different cells. For example, the received signal power of a reference signal can be measured. In LTE and other systems, a UE can measure and report reference signal received power (RSRP) or reference signal received quality (RSRQ). In order to perform a measurement on a signal from a cell, a UE is typically synchronized to the cell. In LTE, for example, the cell specific reference signal (CRS) is transmitted in a subset of the subframes and on a subset of the symbols in a subframe. Therefore, in order to perform a measurement on the CRS from a particular cell, the UE can extract the time-frequency parts of the received signal that contain the CRS from the cell it desires to measure, using time and frequency synchronization to that cell.

Another cell-directed UE action involves the UE initiating a random access procedure in order to connect to a cell. This can be advantageous if the UE has been idle for a long time, or is performing a handover between cells. A random access procedure typically starts with the transmission of a first random access signal by the UE. This signal can be transmitted in accordance with time and frequency synchronization of the cell to which the UE wishes to connect. In LTE, for example, the first random access signal is called the physical random access channel (PRACH) preamble. The PRACH may be advantageously transmitted in well-defined time-frequency resources of the cell in order to be detected by the eNB.

In another cell-directed UE action, a UE receives data from a cell or transmits data to a cell. In order to do this, a UE needs to be synchronized to the cell in conventional systems. In an LTE cell for example, the downlink and uplink transmissions may be confined to a set of resource blocks, which have well-defined time and frequency parameter values, in relation to the synchronization of the cell.

Each of the aforementioned cell-directed UE actions, i.e. UE measurements, random access, and data reception and transmission, involves the UE being synchronized with the cell.

A cell towards which a UE performs a cell-directed UE action is called a target cell. Hence, consistent with the previously described examples, a UE can perform a measurement on a signal from a target cell; a UE can initiate random access towards a target cell, for example by transmitting a random access signal; a UE can receive a data transmission from a target cell; and a UE can transmit data to a target cell. Further, consistent with the previous description, in performing these cell-directed UE actions, the UE becomes synchronized to the target cell.

Synchronization to the target cell may be unsatisfactory with respect to accuracy, power consumption, complexity, time duration, or with respect to other issues between the UE and targeted cell, however.

SUMMARY

The present disclosure relates to wireless communication systems. Wireless communication systems include a multitude of UEs and cells that form a network. UEs are mobile devices that move through different geographical regions and include but are not limited to cellular telephones, pagers, wireless notepads, computers and other mobile communication devices. In order for there to be data transmission between the UEs and a cell, more particularly, in order for there to be data transmission between the UEs and a BS associated with the cell or in order to perform various measurements on a cell, synchronization is needed between the UE and the cell. When the UE is associated with a cell with which it transmits and receives data, the cell is known as a serving cell.

In some embodiments, the synchronization to the cell is obtained in multiple steps. One multiple step embodiment is a two-step synchronization embodiment. In one two-step embodiment in LTE, in the first synchronization step, coarse synchronization, is obtained using the PSS/SSS of the cell. Note that the PSS/SSS indicates the PCI of the cell, from which the UE deduces the time and frequency resources and the sequence of the CRS. In the optional second synchronization step, fine synchronization is obtained. In LTE, fine synchronization is obtained using the CRS of the cell.

UEs may be at any location in the world. In order to effect data transmission and other communication (i.e. in order for the UE to operate or function), the UE needs to perform actions towards cells, i.e. "target cells". The target cell can be identified by various factors such as but not limited to the geographical location of the UE and the cell, measured downlink signal strength at the UE from nearby cells, or measured uplink signal strength at nearby cells from the UE, the interference and load levels at nearby cells, etc. Before actively being used, e. g. before data transmission between the UE and the target cell, the UE will advantageously perform one or more cell-directed UE actions toward a target cell that enable the UE to work well. The UE must be synchronized with the target cell when it performs the cell-directed UE actions with the cell. Such cell-directed UE actions include but are not limited to cell-directed actions [a] through g)] described below. In some cellular system embodiments, the UE becomes synchronized with a synchronization or the target cell e.g. in time and/or frequency, prior to carrying out the cell-directed UE actions. In this embodiment, the UE can synchronize with the synchronization cell then perform a cell-directed UE action with the target cell. In some embodiments the UE becomes further synchronized with the cell by carrying out the cell-directed UE actions such as cell detection or synchronization-related parameter estimation, according to methods of the disclosure. In these embodiments, a partial or coarse synchronization with the synchronization cell, may take place prior to the cell-directed UE action which serves as a second step in the synchronization process with the target cell.

According to the present disclosure, the network including the UEs and the cells, identifies a suitable synchronization cell. Various processors are used to identify the suitable synchronization cell. The synchronization cell is a cell to which the UE can be synchronized. The network may include a network planning component, a radio network server or other network monitoring server that maintains a table or otherwise keeps track of synchronization parameters, level of mutual synchronization, geographical locations, carrier frequencies, etc., of the BSs in the various cells in order to identify the suitable synchronization cell, in various embodiments. The network may include various components that measure the synchronization parameters, level of mutual synchronization, geographical location and characteristics of the BSs in the various cells, in order to identify a suitable synchronization cell or set of synchronization cells. In other embodiments, other processors identify the synchronization cell or cells.

The network sends an SCI (synchronization cell indicator) signal to the UE identifying at least one "synchronization" cell, i.e. a cell to which the UE can be advantageously synchronized or at least enabling the UE to identify the at least one synchronization cell. The SCI carries with it various different types of information for synchronization in various embodiments. The SCI advantageously carries with it at least a cell-id identifying the synchronization cell in various embodiments. In some embodiments, the SCI contains a set of cell-ids. In other embodiments, the SCI conveys other cell identification information. Various processors and various components such as BSs and other transmitters can send the SCI signal in various embodiments.

The SCI informs a UE that it can use the synchronization to another cell in an action, i.e., the synchronization cell, rather than the cell towards which the cell-directed UE action is directed, i.e., the target cell. In addition to cell-id which can take various forms and convey various data, the SCI may also include a set of synchronization parameter offsets, e.g. a time offset, which the UE may add to the found synchronization of the cell in the SCI.

After receiving the SCI, the UE carries out synchronization actions and becomes synchronized. The synchronization cell may be the serving cell from which the UE receives the SCI, or it may be another cell. In some embodiments, the network includes many cells that are very well synchronized with one another and this enables the UE to become synchronized with one of the cells, i.e. a synchronization cell, and then carry out cell-directed UE actions with another, e.g. target cell, for example and then optionally transmit and receive data by communicating with the other cell.

In some embodiments, the SCI indicates that synchronization may be with the serving cell or another cell, i.e. may be with any of multiple cells. After the UE is synchronized with the synchronization cell and carries out one or more cell-directed UE actions with a target cell, the UE can transmit and receive data with this cell which now acts as the serving cell. This is called hand over from one serving cell to another. In some embodiments the UE keeps using the synchronization cell for synchronization also after the hand over completion.

In summary, in some embodiments, the synchronization cell and the target cell are the same and in other embodiments, the synchronization cell and the target cell differ. In some embodiments, synchronization takes place prior to performing a cell-directed UE action with the target cell and in other embodiments, the performance of the cell-directed UE action with the target cell is a further step in the synchronization process. According to the first embodiment in which synchronization takes place prior to the cell-directed UE action, the synchronization involves various synchronization operations and processes carried out with the synchronization cell (which can be the target cell in embodiments in which the target cell and the synchronization cell are the same). In some embodiments, this synchronization operation/process includes the UE searching for time/frequency synchronization information from a signature signal or pattern. When the UE finds this signature signal or pattern, it gains an understanding of some synchronization characteristics such as timing or frequency, i.e. achieve synchronization. The synchronization operation/process may also include the UE estimating parameters related to the time/frequency characteristics of the cell. After the UE becomes synchronized by performing the aforementioned synchronization operation/process with the synchronization cell, it then carries out a cell-directed UE action with the target cell. According to the second embodiment in which synchronization is continued and in some cases completed, i.e. achieved by carrying out the cell-directed UE action, the cell-directed UE action is preceded by a coarse synchronization step. This is followed by the fine-tuning synchronization step of carrying out the cell-directed UE action with the target cell. According to this embodiment, the coarse synchronization step is carried out with the synchronization cell (which can be the target cell in embodiments in which the target cell and the synchronization cell are the same) and the fine-tuning step used to complete synchronization and achieved by carrying out a cell-directed UE action, is done with the target cell. In another embodiment, the synchronization step carried out with the synchronization cell, e.g. coarse synchronization, is followed by a cell detection UE action directed towards the target cell. In other embodiments, other synchronization-related UE actions are performed with the target cell in conjunction with the synchronization step carried out with the synchronization cell.

BRIEF DESCRIPTION OF THE DRAWING

The present disclosure is best understood from the following detailed description when read in conjunction with the accompanying drawing. It is emphasized that, according to common practice, the various features of the drawing are not necessarily to scale. Like numerals denote like features throughout the specification and drawing.

FIG. 1 is a flowchart showing a method according to some embodiments of the disclosure.

DETAILED DESCRIPTION OF EMBODIMENTS OF THE INVENTION

The disclosure provides the concept of a synchronization cell and a synchronization cell indicator (SCI).

FIG. 1 provides a flowchart illustrating a method according to some embodiments of the disclosure.

At step 101, the network identifies a synchronization cell suitable for a UE. At this stage, the UE or the network may have previously identified a target cell towards which the UE should perform an action. At step 103, the network sends the SCI (synchronization cell indicator) to the UE, identifying a suitable synchronization cell or possibly a number of cells that may serve as synchronization cells or at least carrying information enabling the UE to identify the at least one synchronization cell. In some embodiments, the synchronization cell could be the target cell. An SCI is sent to a single UE (unicast), in some embodiments or to multiple UEs (multicast) or to all UEs in a cell (broadcast), in other embodiments. The SCI includes at least a cell-id of at least one synchronization cell.

At step 105, the UE synchronizes with the synchronization cell and at step 107, the UE carries out a cell-directed UE action with the target cell. In some embodiments, steps 105 and 107 are carried out sequentially. In some embodiments in which synchronization occurs in two parts, the UE is performing a cell-directed UE action in step 107 completes the synchronization process. In this case, steps 105 and 107 are carried out in conjunction with one another and in some embodiments, at least partially simultaneously. According to the two-step embodiment in which steps 105 and 107 are carried out partially simultaneously, synchronization may include the performance of synchronization steps a and b. In one embodiment, synchronization step a is a coarse synchronization step performed on a synchronization cell (step 105) and synchronization step b is a fine-tuning synchronization step that furthers synchronization, and involves the UE carrying out a cell-directed UE action with a target cell (step 107). In other embodiments, both the coarse and fine-tuning steps are performed on the synchronization cell and synchronization step b is additionally performed on a target cell in the embodiment in which synchronization step b is a cell-directed UE action. In some embodiments, synchronization step b is a cell detection action.

At step 109, the synchronized UE performs/operates by exchanging data by transmission and/or reception, with a cell that is now the serving cell, in some embodiments. In other embodiments, at step 109, the synchronized UE takes other actions such as sending a report to the serving cell of measurement results, according to the embodiment in which the cell-directed UE action is a measurement.

The flowchart provides an overview of the method according to various embodiments of the disclosure. Further details of each of the steps described above in conjunction with FIG. 1, are provided below.

The disclosure provides the concept of a synchronization cell and a synchronization cell indicator (SCI), as above.

A UE or the network identifies a target cell towards which the UE should perform an action. The target cell selection can be based on a number of factors including geographical location of the UE and the cell or measured downlink signal strength at the UE from nearby cells, or measured uplink signal strength at nearby cells from the UE, the interference and load levels at nearby cells, etc.

Generally speaking, cell-directed UE actions are necessary for a cellular system to work well. Generally speaking, a UE needs to be synchronized to a cell, at least to some extent, when it performs a cell-directed UE action. In state of the art and other cellular systems, this is obtained by the UE synchronizing to the target cell, using signals transmitted from the target cell. The UE therefore desirably synchronizes with this target cell towards which the UE performs an action. In some situations and embodiments, however, synchronization to a target cell may not be satisfactory. Synchronization to the target cell may be unsatisfactory with respect to accuracy, power consumption, complexity, time duration, or with respect to other issues between the UE and targeted cell.

In various embodiments, the cellular network is aware of the level of synchronization (including known offsets) between different cell BSs in the network, as well as other relevant parameters affecting UE synchronization. In various embodiments, the network may include a network planning component, a radio network server or other network monitoring server that maintains a table or white-list or otherwise keeps track of synchronization parameters of the BSs in the various cells in order to identify a suitable cell for synchronization, i.e. a suitable synchronization cell. The network may include various components that measure the synchronization parameters and characteristics of the BSs in the various cells. In this manner, a processor or other component of the network identifies a synchronization cell and the network may identify that multiple cells share the same synchronization parameters and characteristics and could serve as synchronization cells.

Due to the aforementioned potential problems associated with synchronization to a target cell, in some embodiments, it may be beneficial to instruct a UE to use one cell for synchronization and another cell for a cell-directed UE action. One embodiment in which this is particularly useful is if the network has determined that the UE synchronization accuracy of a synchronization cell is better than that of a target cell. In some situations, a UE may not even be able to obtain synchronization to a target cell. This may be due to synchronization signal interference, even in cases in which the UE still could have been able to perform a cell-directed UE action to/with the target cell. In such cases, the UE benefits from synchronization assistance from the network, in order to be able to perform the cell-directed UE action.

In such scenarios and other embodiments, the network identifies a suitable synchronization cell according to the present disclosure. The synchronization cell is a cell to which the UE can be synchronized when performing an action towards the target cell.

As a general rule, a UE performs an action towards a target cell in a way that is synchronized, at least to some extent, to the target cell. In state of the art and other cellular systems, the synchronization is obtained by using signal(s) from the target cell. In accordance with various embodiments of the disclosure, the synchronization is obtained by using signal(s) from a synchronization cell together with other information in an SCI. The synchronization accuracy varies in various embodiments. In some embodiments, synchronization is obtained in advance of the cell-directed UE action. In some embodiments, synchronization is obtained in conjunction with the cell-directed UE action as described below. The cell-directed UE actions include performing one or more measurements on one or more signals from a cell, but are described in further detail below. In various LTE embodiments, a UE can synchronize to a cell by detecting PSS/SSS from the cell and/or estimating synchronization parameters based on PSS/SSS and/or CRS from the cell.

Various other cell-directed UE actions are described below for various cellular system embodiments. Embodiments of cell-directed UE actions that use synchronization to a target cell are discussed in cell-directed UE actions (a)-(g) presented below.

In various embodiments of the present invention, instead of requiring synchronization to a target cell as described below, the cell-directed UE actions are performed using synchronization to a synchronization cell, which is indicated in an SCI as described herein. Note that the synchronization cell is generally different from the target cell in this disclosure (as described herein) but the following cell-directed UE actions, are described with in a state of the art context wherein synchronization is described in the context of synchronization to the target cell obtained from target cell signals.

The following cell-directed UE actions are performed in a manner that is synchronized, at least to some extent, to the target cell.

a) A UE performs a measurement on a signal from a target cell.
b) A UE initiates a random access procedure by transmitting a random access signal to a target cell.
c) A UE receives data from a target cell.
d) A UE transmits data to a target cell.
e) Cell detection (e.g. as part of a cell search): A UE performs a detection operation on a target cell.

In cell detection embodiment e), a UE may obtain synchronization by performing the detection operation for multiple different synchronization parameter values, for example multiple different time and frequency offsets. In this sense, the cell-directed UE action "cell detection" may include only the detection operations which are performed in a synchronized manner. In some embodiments, a cell detection that results in a detected cell can be considered to have been performed with the UE synchronized to the target cell.

f) A UE is synchronized, at least to some extent, to the target cell when it performs an estimation of synchronization parameters of a target cell.

In synchronization parameter estimation embodiment f), the estimation may be performed sometime after synchronization to the target cell has been obtained. Alternatively, this estimation may be performed in conjunction with the UE obtaining synchronization to the target cell. Additionally, the cell-directed UE action "synchronization parameter estimation" may be performed by a UE in a manner that is synchronized, to some extent, to the target cell. Similarly, with respect to the "cell detection" action, this synchronization may be obtained by performing multiple actions for multiple different synchronization parameter values, for example multiple different time and frequency offsets. A subset of "synchronization parameter estimation" actions performed by a UE in a manner synchronized to a target cell, may then be considered as cell-directed UE actions.

g) Cell discovery: A UE is synchronized, at least to some extent, to the target cell when it performs a discovery of a target cell.

A cell discovery process of embodiment g), may be performed by a UE by receiving and processing (e.g. detection and/or estimation of) a cell discovery signal, which is transmitted by a BS. A cell discovery signal may be different from a synchronization signal, for example different from PSS/SSS/CRS in LTE systems, for example a combination of CRS and CSI-RS. Additionally, a cell discovery signal may not provide synchronization by itself, such as for example CRS and CSI-RS in LTE systems.

Various embodiments of cell-directed UE actions that are used in a manner synchronized to a target cell are discussed in cell-directed UE actions (a)-(g) presented above. As would be understood by a person of ordinary skill in the art, the actions (a)-(g) discussed above are only a few examples of such cell-directed UE actions. These examples were described in the context that the UE itself analyzes the signals and/or interacts with the target cell to become synchronized. One or more exemplary embodiments of the invention are described below wherein a cell-directed UE action uses synchronization to a synchronization cell instead of the target cell. According to embodiments in which a cell-directed UE action with a target cell is a second step in a multi-step synchronization embodiment, various other cell-directed UE actions other than the aforementioned examples, can be used for the completion of synchronization.

The present disclosure provides, in various embodiments, that instead of synchronizing only to a target cell (the cell targeted by the UE for an action) using cell-directed UE actions such as the ones described above, the cell-directed UE actions can be performed using synchronization to a synchronization cell, which is indicated in an SCI message sent by the network, e.g. a BS, to a UE to indicate a synchronization cell.

The synchronization cell is identified by a processor or other component of the network as described above. By the network design and properties such as mutual BS synchronization, BS locations, etc., the network may have information on which cells may be used as synchronization cells for which target cells and for which kind of cell-directed UE actions. This connection, e.g. in the form of a table, between target cells, synchronization cells and actions may be (partly) manually provided by a network operator or (partly) automatically obtained by measurements and configurations in the network. The synchronization cell may be the same as, or different from a target cell. Hence, a synchronization cell may be a target cell in a cell-directed UE action or another cell. In some embodiments, the network includes many cells that are perfectly synchronized with one another and this enables the UE to become synchronized with a synchronization cell then carry out cell-directed UE actions with another, i.e. a different, target cell.

Embodiments of the synchronization cell and the synchronization cell indicator (SCI) are discussed below. As used herein, a synchronization cell is a cell to which a UE is synchronized when it performs a cell-directed UE action.

The SCI is a message that may be generated by a processor or other component and sent by a network component such as a BS or other transmitter. The SCI is sent to and received by the UE. The SCI may be sent to a single UE (unicast), multiple UEs (multicast) or all UEs in a cell (broadcast) in various embodiments. In some embodiments, the SCI contains a cell-id. In some embodiments, the SCI contains a set of cell-ids. As above, different transmission characteristics are often used in different cell-ids such as, for example, reference signal sequences, scrambling sequences, synchronization signal properties, and the like. In some embodiments, the SCI contains various other synchronization parameters and characteristics such as time and/or frequency offsets/windows to be used in a cell-directed UE action. In other embodiments, the SCI message delivers other information. The SCI is a signal or other message that indicates that a UE may use another cell (a synchronization cell) for obtaining synchronization than the target cell in a cell-directed UE action directed towards the target cell. A synchronization cell may be indicated in the form of a cell-id. As described above and below, the SCI message may also contain various other information. The SCI communicates with the UE by sending a signal or other message and identifies and indicates the synchronization cell by information included in the message or at least carrying information enabling the UE to identify the at least one synchronization cell. In some embodiments, the SCI carries information that identifies a search window but no synchronization cell-ID.

In various LTE embodiments, the cell-ids include physical cell-ids and virtual cell-ids. In various LTE embodiments (for example in LTE Release 11), there is the concept of "virtual cell-id", in addition to PCI (physical cell identity), defined above. The virtual cell-id is signaled to a UE using higher-layer signaling. The virtual cell-id is, in some embodiments, connected to the scrambling sequence of demodulation reference signals (DMRS) and channel-state information reference signals (CSI-RS). Both physical cell-id and virtual cell-id in LTE are embodiments of a cell-id that may be contained in the SCI and in accordance with the description of the embodiments below.

In some embodiments, synchronization takes place prior to performing a cell-directed UE action with the target cell and in other embodiments, the performance of the cell-directed UE action with the target cell is a further step in the synchronization process. According to the first embodiment in which synchronization takes place prior to the cell-directed UE action, the synchronization involves various synchronization operations and processes carried out with the synchronization cell (which can be the target cell in embodiments in which the target cell and the synchronization cell are the same). In some embodiments, this synchronization operation/process includes the UE searching for time/frequency synchronization information from a signature signal or pattern. When the UE finds this signature signal or pattern, it gains an understanding of some synchronization characteristics such as timing or frequency, i.e. achieve synchronization. The synchronization operation/process may also include the UE estimating parameters related to the time/frequency characteristics of the cell. After the UE becomes synchronized by performing the aforementioned synchronization operation/process with the synchronization cell, it then carries out a cell-directed UE action with the target cell. According to the second embodiment in which synchronization is continued and in some cases completed, i.e. achieved by carrying out the cell-directed UE action, the cell-directed UE action is preceded by a coarse synchronization step. This is followed by the fine-tuning synchronization step of carrying out the cell-directed UE action with the target cell. According to this embodiment, the coarse synchronization step is carried out with the synchronization cell (which can be the target cell in embodiments in which the target cell and the synchronization cell are the same) and the fine-tuning step used to complete synchronization and achieved by carrying out a cell-directed UE action, is done with the target cell. In another embodiment, the synchronization step carried out with the synchronization cell, e.g. coarse synchronization, is followed by a cell detection UE action directed towards the target cell. In other embodiments, other synchronization-related UE actions are performed with the target cell in conjunction with the synchronization step carried out with the synchronization cell.

In some embodiments, the SCI instructs a UE of a synchronization cell for a cell-directed UE action. This means that the UE may use a cell indicated in the SCI or another cell as the synchronization cell.

Various embodiments are described below wherein a cell-directed UE action with the target cell is carried out after obtaining synchronization to a synchronization cell based on the SCI. As would be understood by a person of ordinary skill in the art, the actions (a)-(g) discussed above are only a few embodiments of such cell-directed UE actions and in various other embodiments, the synchronization techniques described herein can relate and be applied to any of various other cell-directed UE actions in other embodiments.

In some embodiments, the SCI instructs a UE of a synchronization cell regarding a cell-directed UE action. In this embodiment, the UE advantageously uses the cell indicated in the SCI as a synchronization cell. In some embodiments, the SCI informs a UE of a possible synchronization cell for a cell-directed UE action. In some embodiments, the UE may use a cell indicated in the SCI or another cell as synchronization cell.

In some embodiments, an SCI contains a temporal search window for the UE.

In some embodiments, the UE desirably uses as the synchronization cell, any cell for which the UE detects a synchronization signal in the search window. In some embodiments, any cell for which the UE detects a synchronization signal in the search window may be used as the synchronization cell.

In some embodiments, the UE advantageously uses as the synchronization cell, any cell in the set of cell-ids in the SCI (the set may contain a single cell-id) for which the UE detects a synchronization signal in the search window. In some embodiments, the UE may use as synchronization cell any cell in the set of cell-ids in the SCI (the set may contain a single cell-id) for which the UE detects a synchronization signal in the search window.

In some embodiments, the SCI contains a target cell, i.e. the target cell and synchronization cell are the same. In some embodiments, the SCI indicates a synchronization cell other than the target cell but a cell on the same carrier frequency as the target cell. In some embodiments, the SCI indicates a synchronization cell other than the target cell but a cell on a different carrier frequency as the target cell.

In some embodiments, the SCI indicates that any cell on a carrier can be used as a synchronization cell. In some embodiments, the SCI explicitly indicates on which carrier any cell can be used as a synchronization cell. In other embodiments, the SCI implicitly indicates on which carrier any cell can be used as a synchronization cell, e.g., on the same frequency carrier as the target cell or, in another embodiment, on the same frequency carrier as the serving cell.

In some embodiments, the SCI contains a synchronization parameter offset set for a synchronization cell. In some embodiments, such a synchronization parameter offset set includes a time offset for the UE to apply in a cell-directed UE action, in relation to the time synchronization found for a synchronization cell. In some embodiments, such a synchronization parameter offset set includes a frequency offset that a UE should apply in a cell-directed UE action to complete synchronization, for example in the two-step process, in relation to the frequency synchronization found for a synchronization cell. A synchronization parameter offset is advantageously utilized in embodiments in which the network is aware of synchronization parameter offsets between a synchronization cell and a target cell. If the network has detected that a target cell has the same time synchronization as a synchronization cell except for a time offset, then the network indicates this time offset in an SCI in various embodiments. The time offset values may vary in various embodiments and may be about 1-10 milliseconds in some embodiments and about 5 milliseconds in one embodiment. The UE can then find the time synchronization to the synchronization cell and then apply this time offset in the cell-directed UE action.

According to various embodiments, a UE with a serving cell on frequency carrier f1 receives an SCI for a cell-directed UE action with a target cell on frequency carrier f2, with the SCI containing a cell on f1. In some embodiments, the SCI contains the serving cell on f1. One embodiment involves the SCI requesting a UE to perform a cell-directed UE action on a target cell on f2 with the serving cell on f1 as the synchronization cell, as indicated in the SCI. This is especially advantageous in embodiments in which the network is aware that the serving cell and the target cell are synchronized.

In some embodiments, a UE with a serving cell on f1 receives an SCI for an SCI for a cell-directed UE action with a target cell on frequency carrier f2, with the SCI containing a cell on f2. In some embodiments, the SCI contains a synchronization cell different cell than the target cell. One embodiment includes a UE being requested to perform a cell-directed UE action on a target cell on f2 with another cell on f2 that is received stronger than the target cell as the synchronization cell, as indicated in the SCI. This embodiment is advantageous in embodiments in which the network is aware that the stronger cell and the target cell (both on f2) are synchronized.

In some embodiments, a UE with a serving cell on f1 receives an SCI for an SCI for a cell-directed UE action with a target cell on the same frequency carrier f1, with the SCI containing a cell on f1. In one embodiment, the SCI contains a different cell than the target cell. One embodiment includes the UE being requested to perform a cell-directed UE action on a target cell on f1 with another cell on f1 that is received stronger than the target cell as synchronization cell, as indicated in the SCI. This embodiment is advantageous in scenarios in which the network knows that the stronger cell and the target cell, both on f1, are synchronized.

In some embodiments, one or more SCIs are included in a UE measurement configuration. A UE measurement configuration is a configuration of a UE by the network regarding measurement parameters related to, for example, intra-frequency measurements, inter-frequency measurement, inter-RAT (Radio Access Technology) measurements. In LTE embodiments, a UE measurement configuration can include a bandwidth over which to measure, a list of cells that should be measured and which quantities to measure, or other measurement configurations.

In various embodiments, a UE measurement configuration contains a measurement configuration for a specific cell, for example a measurement white-list in LTE. A white-list, or allowed list, is a list of the identities of cells in a closed subscriber group (CSG) for which the particular UE has access rights. In one embodiment, an SCI is associated with a cell in a measurement configuration. For measurements on this target cell, a specific SCI is advantageously used. In one embodiment, different cells in a measurement configuration, e.g., different cells in a white-list in LTE, may have separate SCIs.

In some LTE embodiments, an SCI and a measurement white-list are included in a UE measurement configuration. In one embodiment, a UE uses the PSS/SSS of a synchronization cell (from the SCI) to obtain synchronization, while performing a measurement on CRS corresponding to a cell in the measurement white-list. In some embodiments, the measurement white-list contains PCIs. In some embodiments, a measurement white-list contains a specification of resources (LTE resource elements in one embodiment) and a specification of a CRS sequence. In some embodiments, the combination of resources and CRS sequence does not match the combination of any PCI. In another embodiment, the combination matches the combination of a PCI.

In some LTE embodiments, the target cell and/or the synchronization cell include different geographically located, but not co-located, transmission points (e.g. antennas, remote radio units (RRUs), etc.) transmit signals corresponding to the same cell-id, i.e. creating a single cell (sometimes called soft cell, shared cell, CoMP scenario as described in 3GPP TR 36.819 "Coordinated Multi-Point Operation for LTE Physical Layer Aspects," v. 11.2.0, 2013-09, the contents of which are hereby incorporated by reference as if set forth in their entirety). In various embodiments, the transmission points are located close to one another. In some embodiments, the transmission points transmit the same PSS/SSS, since the PSS/SSS directly corresponds to the cell-id. In one embodiment, the transmission points transmit discovery signals, so that a UE can detect and measure different transmission points. In some embodiments, the discovery signal contains CRS. In some embodiments, the discovery signals of different transmission points contain different CRSs, which do not correspond to the cell-id of the cell that the transmission points create. In one embodiment, an SCI and a measurement white-list are included in a UE measurement configuration, where an SCI specifies a cell-id corresponding to a PSS/SSS used by multiple transmission points and where a measurement configuration specifies the different CRS used by different transmission points. In one embodiment, CRS are specified using "virtual cell-ids", similar to what is available for DMRS and CSI-RS in LTE Rel-11 as in Lee et al, "Coordinated Multipoint Transmission and Reception in LTE-Advanced Systems", IEEE Communications Magazine, November 2012, the contents of which are hereby incorporated by reference as if set forth in their entirety.

In some embodiments, a cell-directed UE action is followed by a report by the UE. In some embodiments, a measurement on a cell is followed by a measurement report. In one embodiment, a report from a UE includes a cell-id of a synchronization cell and/or of the target cell, that was used in a cell-directed UE action. In one embodiment, if an SCI includes multiple cell-ids, the UE indicates in a report which cell-id that was used in a cell-directed UE action. In another embodiment, if an SCI includes a search window but no cell-id, the UE indicates in a report which cell-id that was used in a cell-directed UE action. In one embodiment, a report from a UE includes the id of the cell towards which the UE action was directed, for instance a cell-id from a measurement white-list.

In some embodiments, a handover command to a UE contains an SCI, to be used during handover to a target cell. This may be the case in a random access procedure, which may be a part of a handover procedure.

In some embodiments, a scheduling grant (downlink or uplink) contains an SCI to be used during a data reception or transmission process. In some embodiments, a UE uses an SCI to reduce the complexity and/or time duration or to improve the performance of a cell detection (a single cell) and/or cell search (multiple cells). In some embodiments, the UE uses an SCI in a measurement configuration for this purpose.

In some embodiments, a UE uses an SCI to reduce the complexity and/or time duration or to improve the performance of a cell discovery. In one embodiment, a UE uses an SCI so that it may perform a cell discovery without performing cell synchronization actions. In some embodiments, a UE uses an SCI so that it may perform only a subset of the cell synchronization actions typically needed to synchronize to a cell. A UE may use an SCI in a measurement configuration for this purpose.

In some embodiments, a UE uses an SCI to reduce the complexity and/or time duration or to improve the accuracy of an estimation of synchronization parameters. A UE may use an SCI in a measurement configuration for this purpose.

According to one aspect of the disclosure, a method in a wireless communication system, is provided. The method comprises: identifying at least one synchronization cell to which a user equipment (UE) in a mobile network may be synchronized when performing an action; sending a synchronization cell indicator (SCI) to the UE, the SCI identifying the at least one synchronization cell or enabling the UE to identify the at least one synchronization cell; the UE at least partially synchronizing with a first synchronization cell of the at least one synchronization cell; and the UE carrying out a cell-directed UE action directed to a target cell. In some embodiments, the UE further transmits and receives data with the target cell.

According to one aspect of the disclosure, a method in a wireless communication system, is provided. The method comprises: identifying at least one synchronization cell to which a user equipment (UE) in a mobile network may be synchronized when performing an action; sending a synchronization cell indicator (SCI) to the UE, the SCI identifying the at least one synchronization cell; the UE synchronizing with a first synchronization cell of the at least one synchronization cell; and the UE carrying out a cell-directed UE action directed to a target cell using synchronization obtained from the synchronization cell. In some embodiments, the UE further transmits and receives data with the target cell.

According to another aspect of the disclosure, a method in a wireless communication system, is provided. The method comprises: identifying at least one synchronization cell to which a user equipment (UE) in a mobile network may be synchronized when performing an action; sending a synchronization cell indicator (SCI) to the UE, the SCI identifying the at least one synchronization cell; the UE partially synchronizing with a first synchronization cell of the at least one synchronization cell; and the UE carrying out a cell-directed UE action directed to a target cell thereby becoming further synchronized. In some embodiments, the UE further transmits and receives data with the target cell.

According to another aspect of the disclosure, a method in a wireless communication system, is provided. The method comprises identifying at least one synchronization cell to which a user equipment (UE) in a mobile network may be synchronized when performing an action, sending a synchronization cell indicator (SCI) to the UE, the SCI identifying the at least one synchronization cell, the UE at least partially synchronizing with a first synchronization cell of the at least one synchronization cell; and the UE carrying out a measurement on at least a signal from the target cell.

According to another aspect of the disclosure, a cellular communication system is provided. The cellular communication system comprises: a processor configured to identify at least one synchronization cell to which a user equipment (UE) in a mobile network may be at least partially synchronized and to cause a transmitter to send a synchronization cell indicator (SCI) to the UE, the SCI identifying the at least one synchronization cell. The UE is configured to receive the SCI, at least partially synchronize with a first synchronization cell of the at least one synchronization cell and carry out a cell-directed UE action with the target cell. In some embodiments, the UE is configured to at least one of transmit and receive data with the target cell after becoming synchronized with the target cell.

In some embodiments, the UE carrying out a cell-directed UE action with a target cell comprises the UE being configured to, and performing, a measurement on a cell specific reference signal (CRS) corresponding to a cell in a whitelist.

The word "exemplary" is used herein to mean "serving as an example or illustration." Any aspect or design described herein as "exemplary" is not necessarily to be construed as preferred or advantageous over other aspects or designs.

The preceding merely illustrates the principles of the disclosure. It will thus be appreciated that those of ordinary skill in the art will be able to devise various arrangements which, although not explicitly described or shown herein, embody the principles of the disclosure and are included within its spirit and scope. Furthermore, all examples and conditional language recited herein are principally intended expressly to be only for pedagogical purposes and to aid the reader in understanding the principles of the disclosure and the concepts contributed by the inventors to furthering the art, and are to be construed as being without limitation to such specifically recited examples and conditions.

While one or more embodiments of the invention have been described above, it should be understood that they have been presented by way of example only, and not by way of limitation. Likewise, the various figures or diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations.

One or more of the functions described in this document may be performed by an appropriately configured module. The term "module" as used herein, can refer to hardware, firmware, software and any associated hardware that executes the software, and any combination of these elements for performing the associated functions described herein. Additionally, various modules can be discrete modules; however, as would be apparent to one of ordinary skill in the art, two or more modules may be combined to form a single module that performs the associated functions according various embodiments of the invention.

Additionally, one or more of the functions described in this document may be performed by means of computer program code that is stored in a "computer program product", "non-transitory computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate units, processors or controllers may be performed by the same unit, processor or controller. Hence, references to specific functional units are only to be seen as references to suitable means for providing the described functionality, rather than indicative of a strict logical or physical structure or organization.

The invention claimed is:

1. A method in a wireless communication system, said method comprising:
   identifying at least one synchronization cell to which a user equipment (UE) in a mobile network may be synchronized when performing an action;
   sending a synchronization cell indicator (SCI) to said UE, said SCI identifying said at least one synchronization cell or enabling said UE to identify said at least one synchronization cell;
   said UE at least partially synchronizing with a first synchronization cell of said at least one synchronization cell based on said SCI; and
   said UE carrying out a cell-directed UE action directed to a target cell based on said SCI, wherein said first synchronization cell is different than said target cell.

2. The method as in claim 1, wherein said UE carrying out a cell-directed UE action directed to a target cell is done using synchronization obtained from said first synchronization cell during said UE at least partially synchronizing.

3. The method as in claim 1, wherein said UE at least partially synchronizing comprises said UE only partially synchronizing and said UE carrying out a cell-directed UE action directed to a target cell comprises another synchronization step.

4. The method as in claim 1, wherein said UE carrying out a cell-directed UE action comprises said UE at least one of transmitting data with said target cell, receiving data from said target cell, performing a measurement on a signal from said target cell and transmitting a random access signal to said target cell.

5. The method as in claim 1, wherein said SCI indicates said cell-directed UE action for said UE to carry out with said target cell.

6. The method as in claim 1, wherein said SCI identifies said at least one synchronization cell by including therein a cell-id.

7. The method as in claim 6, wherein said wireless communication system comprises a Long Term Evolution (LTE) system and said cell-id comprises one of a physical cell identity (PCI) and a virtual cell-id, said virtual cell-id associated with a scrambling sequence of demodulation reference signals (DMRS) and channel-state information reference signals (CSI-RS).

8. The method as in claim 1, wherein said UE at least partially synchronizing comprises said UE using signals from said first synchronization cell to obtain at least partial synchronization with said target cell.

9. The method as in claim 1, wherein said at least one synchronization cell comprises a plurality of said synchronization cells and wherein said SCI identifies said plurality of said synchronization cells by including therein a corresponding plurality of cell-ids.

10. The method as in claim 1, wherein said SCI includes therein a set of cell-ids and said first synchronization cell can be any cell having an associated cell-id being one of said set of cell-ids.

11. The method as in claim 1, wherein said SCI indicates a carrier and said first synchronization cell comprises any cell of said carrier.

12. The method as in claim 1, wherein said SCI indicates a cell-id and said cell-directed UE action and includes a synchronization parameter offset including one of a time offset and a frequency offset to be used in said cell-directed UE action.

13. The method as in claim 1, wherein said UE is associated with a serving cell with a first carrier frequency, said target cell includes a second carrier frequency being different from said first carrier frequency, said SCI identifies said at least one synchronization cell with said first carrier frequency, and said first synchronization cell includes the same synchronization characteristics and parameters as said target cell.

14. The method as in claim 1, wherein said first synchronization cell includes the same synchronization characteristics and parameters as said target cell.

15. The method as in claim 1, wherein said UE is associated with a serving cell with a first carrier frequency, said target cell includes said first carrier frequency, and said SCI identifies said at least one synchronization cell with said first carrier frequency.

16. The method as in claim 1, wherein said wireless communication system comprises a Long Term Evolution (LTE) system and said UE at least partially synchronizing comprises said UE using primary and secondary synchronization signals (PSS and SSS) of said first synchronization cell to synchronize with said first synchronization cell.

17. The method as in claim 16, wherein said UE at least partially synchronizing with a first synchronization cell includes said UE performing a measurement on a cell specific reference signal (CRS) corresponding to a cell in a white-list.

18. The method as in claim 17, wherein said white-list includes physical cell identities (PCIs) therein.

19. The method as in claim 17, wherein said white-list includes a specification of LTE resource elements and a specification of a cell specific reference signal (CRS) sequence.

20. The method as in claim 1, wherein said SCI is included in a UE measurement configuration of said mobile network, said UE measurement configuration including measurement parameters related to at least one of intra-frequency measurements, inter-frequency measurements and inter-RAT (radio access technology) measurements.

21. The method as in claim 1, wherein at least one of said first synchronization cell and said target cell comprise multiple transmission points transmitting signals with the same cell-id.

22. The method as in claim 21, wherein said multiple transmission points transmit the same primary and secondary synchronization signals and said multiple transmission points are not geographically co-located.

23. The method as in claim 22, wherein said multiple transmission points transmit discovery signals that contain different cell specific reference signals (CRSs).

24. The method as in claim 23, wherein said different CRSs do not correspond to said cell-id.

25. The method as in claim 21, wherein said multiple transmission points transmit different cell-specific reference signals (CRSs), each associated with a virtual cell-id associated with a scrambling sequence of demodulation reference signals (DMRS) and channel-state information reference signals (CSI-RS).

26. The method as in claim 1, wherein said wireless communication system comprises a long term evolution (LTE) system, said target cell corresponds to multiple non co-located transmission points, and said multiple transmission points transmit cell specific reference signals (CRSs) not corresponding to a target cell-id.

27. The method as in claim 26, wherein said SCI specifies a cell-id for said target cell and wherein a UE measurement configuration specifies further cell-ids corresponding to said CRS.

28. The method as in claim 1, wherein said UE carrying out a cell-directed UE action includes said UE carrying out a measurement on at least a signal from said target cell, and further comprising said UE subsequently issuing a measurement report, said measurement report including a cell-ID of said first synchronization cell.

29. The method as in claim 1, wherein said SCI comprises a search window but no synchronization cell-ID, said cell-directed UE action includes said UE conducting a measurement, and further comprising said UE issuing a measurement report identifying a synchronization cell-ID used in said cell-directed UE action.

30. The method as in claim 29, further comprising said UE obtaining said synchronization cell-id from a measurement white-list.

31. The method as in claim 1, wherein said sending a SCI includes one of a downlink or uplink scheduling grant including said SCI.

32. The method as in claim 1, wherein said UE carrying out a cell-directed UE action includes said UE carrying out a cell search of multiple cells.

33. The method as in claim 1, wherein said SCI includes a plurality of cell synchronization actions and wherein said UE at least partially synchronizing with a first synchronization cell of said at least one synchronization cell comprises said UE performing only a subset of said plurality of cell synchronization actions.

34. The method as in claim 1, wherein said SCI includes a temporal search window for the UE, and said UE detects a synchronization signal from said first synchronization cell in said search window.

35. The method as in claim 1, wherein said sending a synchronization cell indicator (SCI) to said UE comprises a handover command to a UE containing said SCI.

36. The method as in claim 1, wherein said SCI is associated with a cell in a measurement configuration.

37. The method as in claim 36, wherein said measurement configuration comprises a white-list and said wireless communication system comprises a Long Term Evolution (LTE) system.

38. A method in a wireless communication system, said method comprising:
  identifying at least one synchronization cell to which a user equipment (UE) in a mobile network may be synchronized when performing an action;
  sending a synchronization cell indicator (SCI) to said UE, said SCI identifying said at least one synchronization cell;
  said UE carrying out a synchronization stop with a first synchronization cell of said at least one synchronization cell based on said SCI; and
  said UE carrying out a cell-directed UE action directed to a target cell using synchronization obtained from said first synchronization cell based on said SCI wherein said first synchronization cell is different than said target cell.

39. A method in a wireless communication system, said method comprising:
- identifying at least one synchronization cell to which a user equipment (UE) in a mobile network may be synchronized when performing an action;
- sending a synchronization cell indicator (SCI) to said UE, said SCI identifying said at least one synchronization cell;
- said UE partially synchronizing with a first synchronization cell of said at least one synchronization cell based on said SCI; and
- said UE carrying out a cell-directed UE action directed to a target cell thereby becoming further synchronized based on said SCI, wherein said first synchronization cell is different than said target cell.

40. A method in a wireless communication system, said method comprising:
- identifying at least one synchronization cell to which a user equipment (UE) in a mobile network may be synchronized when performing an action;
- sending a synchronization cell indicator (SCI) to said UE, said SCI identifying said at least one synchronization cell;
- said UE at least partially synchronizing with a first synchronization cell of said at least one synchronization cell based on said SCI; and
- said UE carrying out a measurement on at least a signal from said target cell based on said SCI, wherein said first synchronization cell is different than said target cell.

41. A cellular communication system comprising:
- a processor configured to identify at least one synchronization cell to which a user equipment (UE) in a mobile network may be at least partially synchronized and to cause a transmitter to send a synchronization cell indicator (SCI) to said UE, said SCI at least indirectly identifying said at least one synchronization cell;
- said UE configured to receive said SCI, at least partially synchronize with a first synchronization cell of said at least one synchronization cell and carry out a cell-directed UE action with a target cell based on said SCI; and
- said UE configured to at least one of transmit and receive data with said target cell after becoming synchronized with said target cell based on said SCI, wherein said first synchronization cell is different than said target cell.

42. The cellular communication system as in claim 41, wherein said SCI is a signal that includes a cell-id.

43. The cellular communication system as in claim 41, wherein said SCI is a signal that includes a set of cell-id's associated with a plurality of synchronization cells.

44. The cellular communication system as in claim 41 wherein said UE is configured to partially synchronize with said first synchronization cell and to become further synchronized by carrying out said cell-directed UE action with said target cell.

45. The cellular communication systems as in claim 41, wherein said UE is configured to obtain synchronization with said first synchronization cell and to carry out said cell-directed action with said target cell using synchronization obtained from said first synchronization cell.

46. The cellular communication system as in claim 42, wherein said cellular communication system comprises a Long Term Evolution (LTE) system and said cell-id comprises one of a physical cell identity (PCI) and a virtual cell-id, said virtual cell-id associated with a scrambling sequence of demodulation reference signals (DMRS) and channel-state information reference signals (CSI-RS).

47. The cellular communication system as in claim 41, wherein said cellular communication system comprises a Long Term Evolution (LTE) system and said UE uses primary and secondary synchronization signals (PSS and SSS) of said first synchronization cell to synchronize with said first synchronization cell.

48. The cellular communication system as in claim 46, wherein said UE configured to carry out a cell-directed UE action with a target cell comprises said UE configured to perform a measurement on a cell specific reference signal (CRS) corresponding to a cell in a white-list.

49. The cellular communication system as in claim 48, wherein said white-list includes physical cell identities (PCIs) and a specification of LTE resource elements and a specification of cell specific reference signal (CRS) sequence.

50. The cellular communication system as in claim 41, wherein said target cell comprises a plurality of transmission points that are not geographically co-located and wherein said multiple transmission points transmit cell specific reference signals (CRSs) not corresponding to a target cell-id.

51. The cellular communication system as in claim 50, wherein said transmission points include at least one of antennas and remote radio units.

52. The cellular communication system as in claim 50, wherein said transmission points transmit the same primary and secondary synchronization signals.

53. The cellular communication system as claim 41, wherein said cellular communication system includes a UE measurement configuration, said UE measurement configuration includes a measurement white-list and said SCI is associated with a cell in said UE measurement configuration.

54. The cellular communication system as claim 53, wherein said cellular communication system comprises a plurality of cells in said UE measurement configuration and wherein said plurality of cells are included in said measurement white-list and are associated with further SCI's.

55. The method as in claim 1, wherein said SCI is included in a UE measurement configuration of said mobile network, said wireless communication system comprises a Long Term Evolution (LTE) system said SCI identifies said at least one synchronization cell by including therein a cell-id comprising a physical cell identity (PCI) of said at least one synchronization cell.

56. The method as in claim 55, wherein said UE at least partially synchronizing comprises said UE using primary and secondary synchronization signals (PSS and SSS) corresponding to said PCI to synchronize with said first synchronization cell.

57. The method as in claim 1, wherein said SCI is included in a UE measurement configuration of said mobile network, said wireless communication system comprises a Long Term Evolution (LTE) system said SCI includes a physical cell identity (PCI) that identifies said at least one synchronization cell and said SCI further includes therein a cell-id comprising a virtual cell ID of a target cell, said virtual cell ID associated with a scrambling sequence of demodulation reference signals (DMRS) and channel-state information reference signals (CSI-RS).

\* \* \* \* \*